Figure 1:
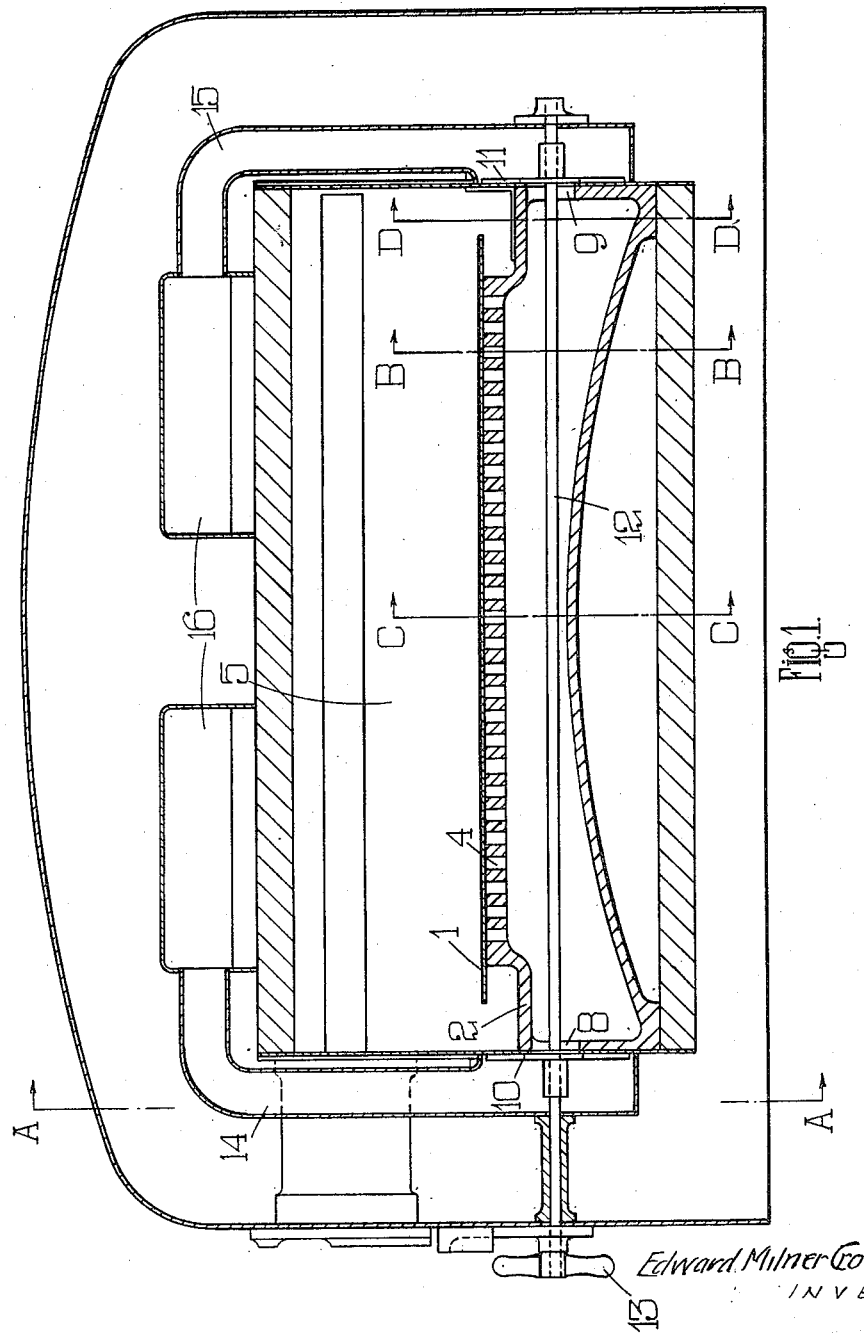

Jan. 16, 1951 E. M. CROSLAND 2,538,555
BAKING OVEN
Filed Feb. 13, 1948 2 Sheets-Sheet 1

Edward Milner Crosland,
INVENTOR.
BY
S. Victor Armstrong
Atty.

Jan. 16, 1951  E. M. CROSLAND  2,538,555
BAKING OVEN
Filed Feb. 13, 1948  2 Sheets-Sheet 2

Edward Milner Crosland, INVENTOR
BY
S. Victor Armstrong
ATTY.

Patented Jan. 16, 1951

2,538,555

UNITED STATES PATENT OFFICE 2,538,555

BAKING OVEN

Edward Milner Crosland, Culcheth, near Warrington, England, assignor to T. & T. Vicars Limited, Earlestown, Newton-le-Willows, England, a British company Application February 13, 1948, Serial No. 8,227
In Great Britain April 20, 1942

Section 1, Public Law 690, August 8, 1946
Patent expires April 20, 1962

4 Claims. (Cl. 107—55)

The present invention relates to improvements in baking ovens of the type in which articles to be baked are passed through the oven on a travelling conveyor formed of a moving steel band or wire mesh web.

Such ovens are particularly suitable for the baking of biscuits and the like goods, and are also suitable in the baking of enamelled articles.

In such ovens it has been usual to apply heat either above the goods or above and below the goods.

In baking ovens for biscuits it is customary to heat the baking chamber by means of gas burners underneath and above the goods, and in the process the goods being baked give off a quantity of steam, which steam going into the atmosphere of the baking chamber has to be exhausted by means of flues, which are customarily in the roof of the baking chamber. As the steam generated is at a lower temperature than the atmosphere of the baking chamber, it is necessarily heavier than the surrounding atmosphere and has a tendency to stay around the goods being baked until sufficiently heated, when it will mix with the baking chamber atmosphere.

Additionally, if gas burners are used to heat the baking chamber, then the products of combustion are formed in considerable quantities and these hot products of combustion, particularly from the burners underneath the goods, impinge on the band and give up a certain amount of heat and then have to pass outward around the edge of the band to get into the upper baking chamber and finally through to the exhaust.

In the case where biscuits are baked on a wire, the hot products of combustion come underneath the goods, impinge on the biscuits, then pass around the edge of the biscuit through the wire mesh and into the upper baking chamber. In each case the flow of the hot gases is liable to cause uneven baking of the goods by reason of the gases passing around the edge of the band or round the edges of the biscuits.

An object of this invention is to remove any layer of gas or steam which may lie on or adhere to the lower surface of the conveyor and which will be at a lower temperature than the normal baking temperature prevailing in the oven.

According to the present invention vapour or gas is led off from points disposed immediately beneath the travelling band or web conveyor.

By this means steam from the goods, and also the products of combustion, are withdrawn at a position which will cause the minimum disturbance of the baking chamber atmosphere.

The invention is more particularly described with reference to the accompanying drawings, in which—

Figure 2:
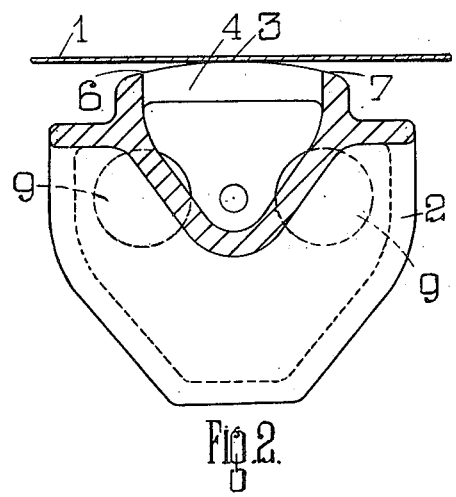
Figure 3:
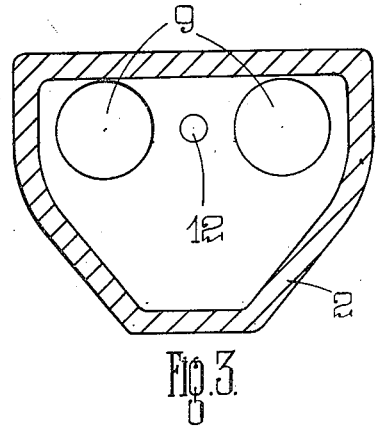
Figure 4:
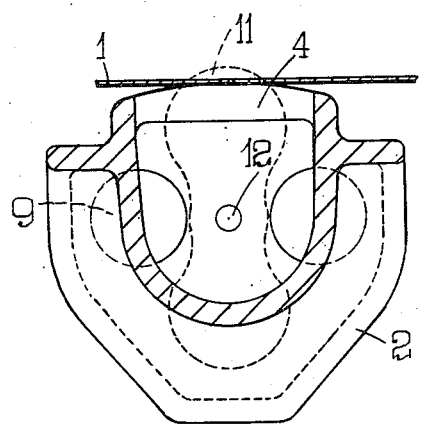
Figure 5:
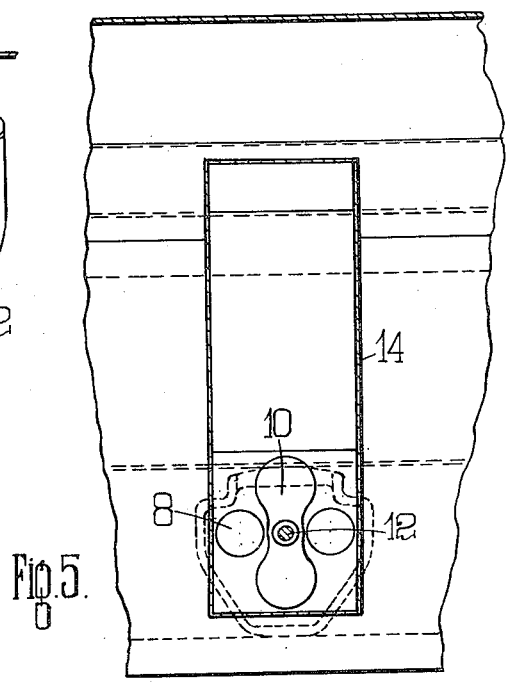

Figure 1 is an end sectional elevation through one form of oven to which the present invention is applied, Figure 2 is a section on the line C—C of Figure 1, Figure 3 is a section on the line D—D of Figure 1, Figure 4 is a section on the line B—B of Figure 1, Figure 5 is a section on the line A—A of Figure 1.

Biscuits or the like articles to be baked are conveyed through the oven upon a travelling conveyor 1 supported on a number of hollow members 2, preferably having a slightly convex open surface 3 which is slotted as at 4, so that steam and gas from the baking chamber 5 may pass under the conveyor 1 and through the gaps 6, 7, between the top surface 3 of the elements 2 and the conveyor 1. These elements 2 form hollow ducts extending to the sides of the oven and have ports 8, 9 at their ends, the cross-section through which is controlled by means of damper plates 10, 11, respectively, on a shaft 12 passing through to the outside of the furnace and provided with a handle 13. These ports 9 communicate with exhaust ducts 14, 15, respectively, which communicate with exhaust passages 16 connected to an exhaust fan.

If desired, additionally to drawing away steam and products of combustion from the baking space 5, certain products may be drawn away from perforations in the roof or sides of the oven.

I declare that what I claim is:

1. A baking oven including a travelling band conveyor, a plurality of hollow elements each extending laterally of said conveyor and having a perforated top surface supporting the under side of said band, and means to lead off gas and vapour from within said perforations.

2. A baking oven including a travelling conveyor, a plurality of hollow elements each extending laterally of said conveyor and having a bevelled and perforated top surface, part only of which supports the lower surface of said conveyor, and exhaust ducts connected to said hollow elements for removing vapour and gas from the perforations in said elements.

3. A baking oven including a travelling conveyor, a number of hollow elements extending to the side walls of the oven and each having a perforated top surface and ports in its walls to leave parts between said ports supporting the lower surface of said conveyor, exhaust ducts connected with said ports, and means to vary the cross-sectional area of said ports.

4. A baking oven comprising, in combination, a travelling conveyor, and a plurality of suction means located closely adjacent to the lower surface of said conveyor acting to draw off vapors and gas from a plurality of segregated points on said lower surface.

EDWARD MILNER CROSLAND.

REFERENCES CITED

The following references are of record in the file of this patent:

UNITED STATES PATENTS

| Number | Name | Date |
|---|---|---|
| 1,663,115 | Comstock | Mar. 20, 1928 |